(No Model.) 4 Sheets—Sheet 1.
J. T. BUDD.
FEED WATER HEATER AND PURIFIER.
No. 562,801. Patented June 30, 1896.
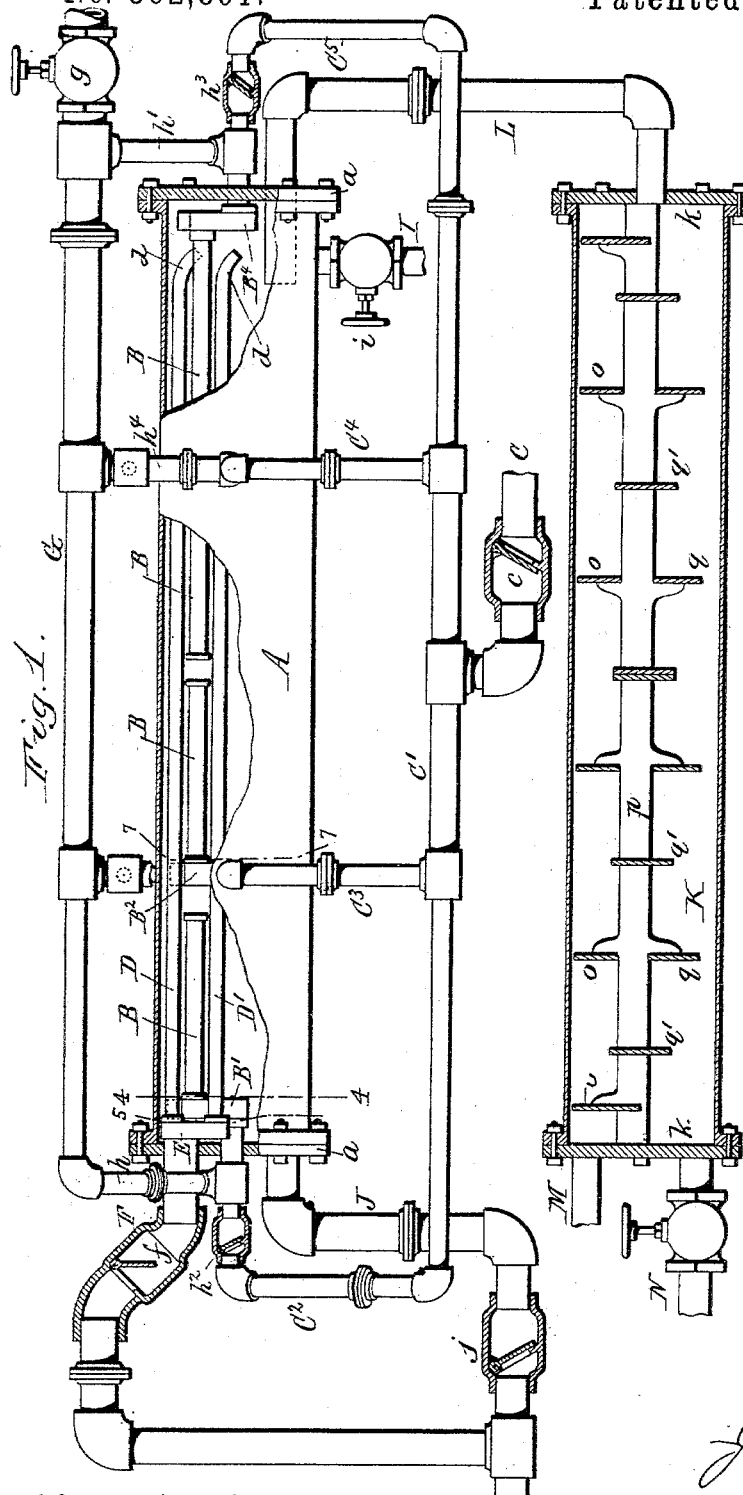
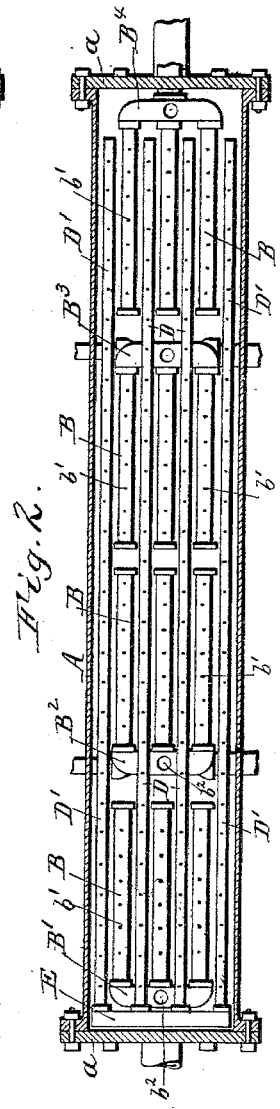
WITNESSES.
Chas. F. Burkhardt
Henry L. Deck
INVENTOR.
J. T. Budd
By Wilhelm Bonner
ATTORNEYS.
ANDREW B.GRAHAM. PHOTO-LITHO. WASHINGTON, D.C.

(No Model.)  4 Sheets—Sheet 2.
J. T. BUDD.
FEED WATER HEATER AND PURIFIER.
No. 562,801. Patented June 30, 1896.
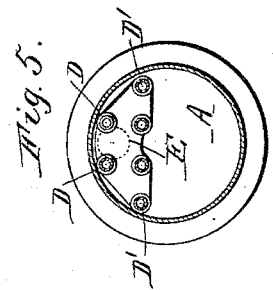
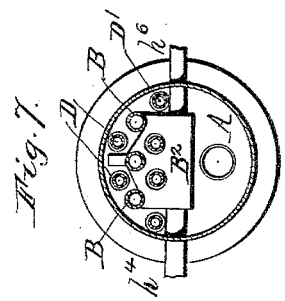
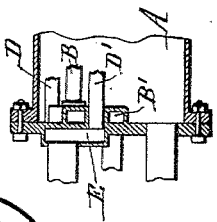
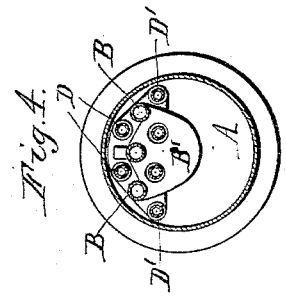
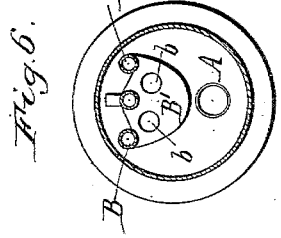
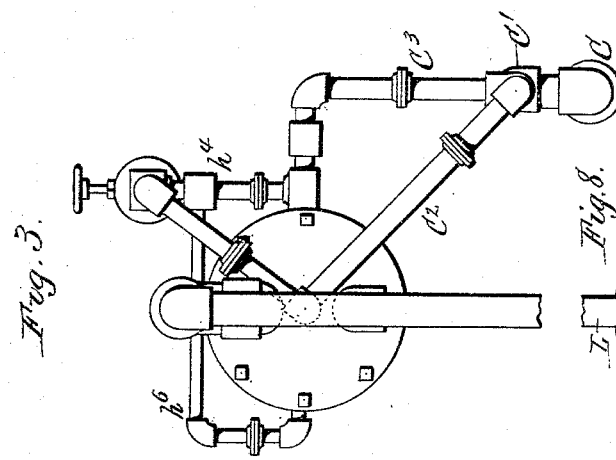
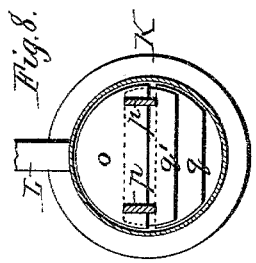
WITNESSES:
Chas F Burkhardt
Henry L Deck
J. T. Budd INVENTOR.
By Wilhelm & Bonner
ATTORNEYS.

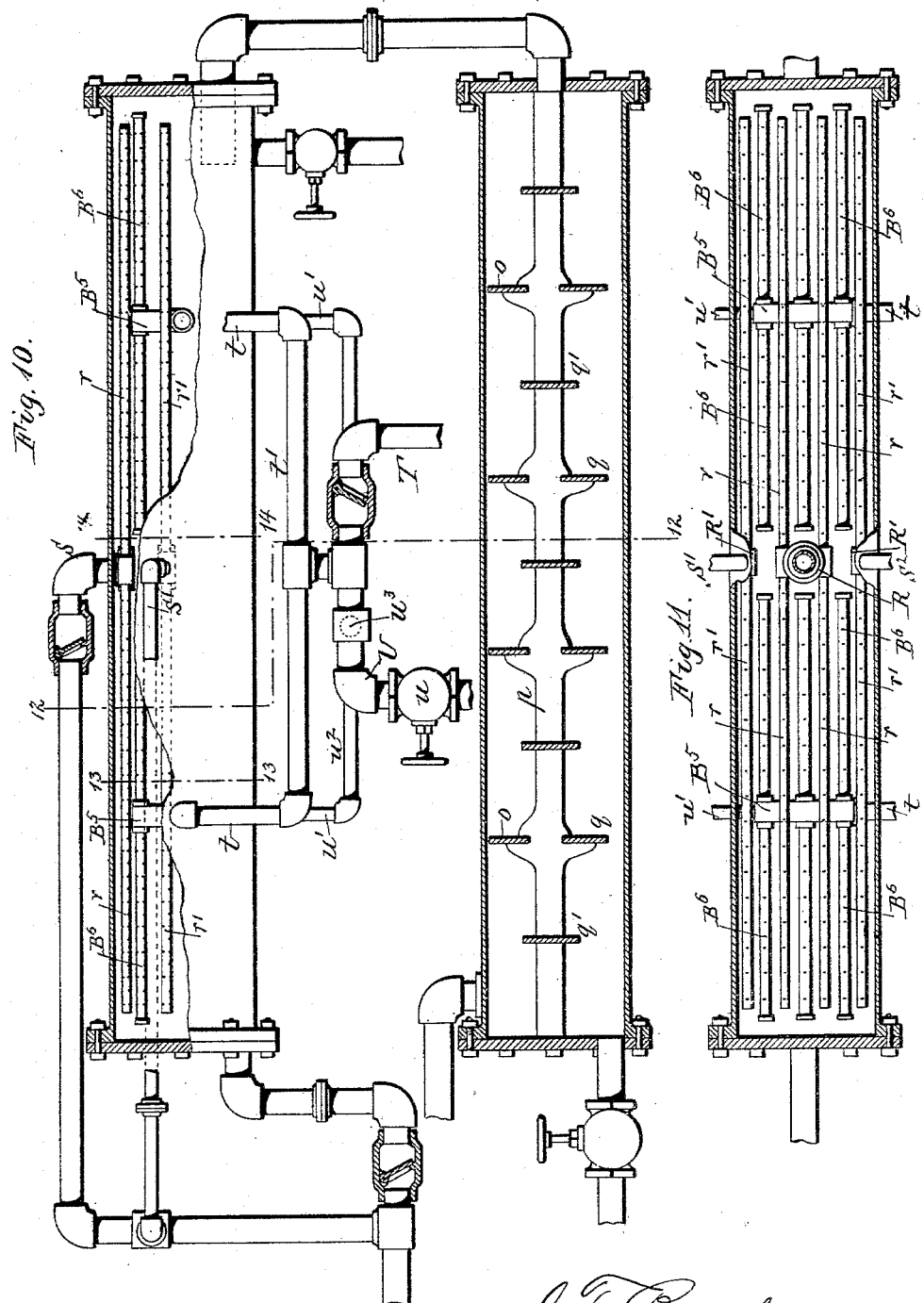

(No Model.) 4 Sheets—Sheet 4.
J. T. BUDD.
FEED WATER HEATER AND PURIFIER.
No. 562,801. Patented June 30, 1896.
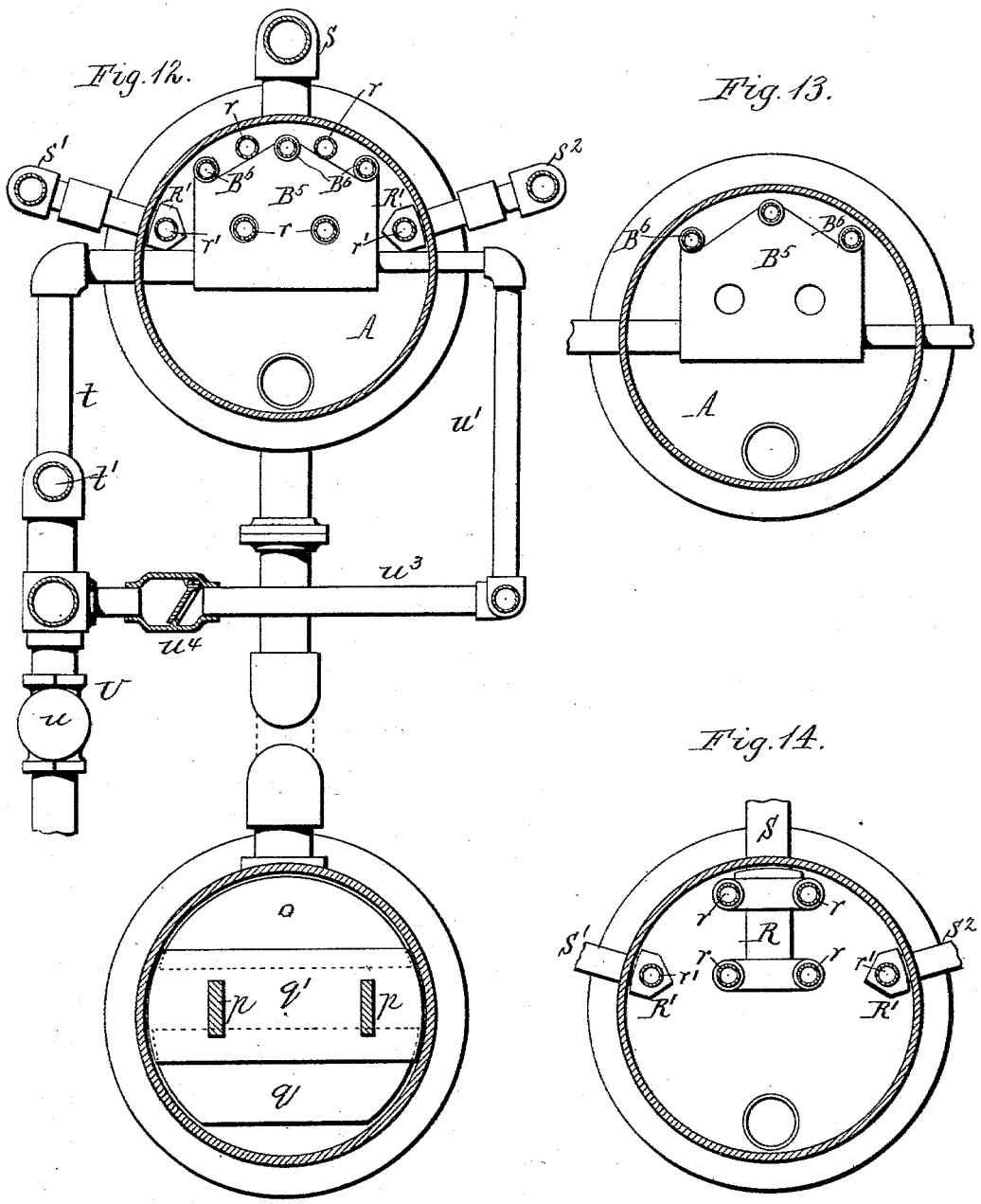
WITNESSES:
Chas. T. Burkhardt
Henry L. Deck
J. T. Budd  INVENTOR.
By Wilhelm Bonner
ATTORNEYS.

UNITED STATES PATENT OFFICE.

J. TALMAN BUDD, OF BUFFALO, NEW YORK.

FEED-WATER HEATER AND PURIFIER.

SPECIFICATION forming part of Letters Patent No. 562,801, dated June 30, 1896.

Application filed September 21, 1895. Serial No. 563,209. (No model.)

*To all whom it may concern:*

Be it known that I, J. TALMAN BUDD, a citizen of the United States, residing at Buffalo, in the county of Erie and State of New York, have invented new and useful Improvements in Feed-Water Heaters and Purifiers, of which the following is a specification.

This invention relates to that class of feed-water heaters and purifiers which comprise, essentially, a heating-chamber into which the water and steam are delivered in numerous jets or fine streams and in close proximity to each other, and a settling-chamber having skimming plates or diaphragms which intercept the impurities suspended in the water.

My invention has for its principal object to prevent contact of the incoming water with any hot metallic surfaces, except the bottom and sides of the heating-chamber, so as to avoid the deposit of scale or sediment on the hot steam-pipes, which is liable to occur when the entering water flows upon these pipes, or over heating-plates, or any hot surfaces.

The invention has the further objects to so construct the water-distributing devices that the steam in the chamber has free ingress and egress to and from the space in the water-delivery pipes above the water-level therein, so that the steam remains at all times on top of the water in said pipes, whereby the steam is prevented from becoming commingled with the water and the pounding or hammering resulting therefrom is avoided.

Additional objects of my invention are to provide manifolds for the easy connection of the steam and water system of distributing-pipes, to provide an efficient blow-off for clearing the water-delivery pipes of impurities, and to support the skimming-plates of the settling-chamber in such a manner as to avoid perforating the shell of said chamber.

In the accompanying drawings, consisting of four sheets, Figure 1 is a sectional side elevation of a feed-water heater and purifier containing my improvements and designed for use in connection with a marine boiler. Fig. 2 is a horizontal section of the heating-chamber. Fig. 3 is a view of the front end of the heating-chamber and connecting-pipes. Figs. 4 and 5 are cross-sections of the heating-chamber in lines 4 4 and 5 5, Fig. 1. Fig. 6 is a similar section in line 4 4, Fig. 1, with the adjacent steam-manifold omitted to more clearly show the water-manifold. Fig. 7 is a cross-section in line 7 7, Fig. 1. Fig. 8 is a cross-section of the settling-chamber. Fig. 9 is a fragmentary longitudinal section of the heating-chamber, showing a modified construction of the steam and water manifolds. Fig. 10 is a sectional side elevation of a modified form of my improved heater and purifier designed for use in connection with an ordinary steam-boiler. Fig. 11 is a horizontal section of the same. Fig. 12 is a cross-section in line 12 12, Fig. 10, on an enlarged scale. Fig. 13 is a similar section in line 13 13, Fig. 10, with the steam-distributing pipes omitted. Fig. 14 is a similar section in line 14 14, Fig. 10, with the water-pipes omitted.

Like letters of reference refer to like parts in the several figures.

Referring to the constructions shown in Figs. 1 to 7, A represents the heating or separating chamber into which the water is delivered, and which preferably consists of a horizontal cylindrical tube or shell having its ends closed by heads $a$.

B represents a tier or series of longitudinal water delivery or distributing pipes arranged side by side in the upper portion of the heating-chamber and provided on their under sides with a row of perforations through which the water issues downward into the heating-chamber in fine jets or streams. These water-delivery pipes are preferably arranged in independent groups, forming together a series of horizontal pipes extending from end to end of the chamber. The pipes of the several groups are connected at one end with supply manifolds or chambers $B'$ $B^2$ $B^3$ $B^4$, respectively, which latter are supplied in turn from the main water-supply pipe C by a longitudinal pipe $C'$ and ascending branch pipes $C^2$, $C^3$, $C^4$, and $C^5$. In the construction shown in the drawings four groups of water-delivery pipes are employed, each group comprising three pipes, and all of the pipes extend inwardly from their manifolds, whereby the two groups of pipes on one side of the middle of the chamber extend in the opposite direction from the two groups on the other side thereof. The supply-pipes $C^2$ $C^5$ of the end water-manifolds $B'$ $B^4$ enter the outer or front sides of said manifolds and extend through the end heads of the heating-chamber. The supply-pipes $C^3$ $C^4$ of the intermediate water-manifolds $B^2$ $B^3$ extend through the shell of the heating-chamber and enter one side of said manifolds. The main water-supply pipe is provided with the usual check-valve $c$ for preventing the return of the water into said pipe.

D D' represent two tiers of perforated horizontal steam delivery or distributing pipes arranged in the upper portion of the heating-chamber in close proximity to the water-jets from the tier of water-pipes, so that the water issuing from the water-pipes is met by the steam-jets issuing from the steam-pipes and thoroughly heated thereby. The water-pipes are preferably located between the two tiers of steam-pipes, and are arranged to alternate with the steam-pipes, or, in other words, the water-pipes are arranged opposite the spaces between the steam-pipes, as shown in the drawings, so that the descending water does not fall upon the lower tier of steam-pipes, but through the spaces between the same and without coming in contact therewith. When the water is allowed to flow over the steam-pipes or other hot metallic surfaces in the steam-space of the heating-chamber, the solid impurities in the water are deposited upon the same in the form of scale, which is objectionable. By the relative arrangement of the steam and water distributing pipes shown in the drawings the water cannot come in contact with the steam-pipes, thus avoiding such deposits on the same. As the bottom of the heating-chamber is always submerged or covered with water and not externally heated, the impurities settling in the same are readily blown off.

The steam-distributing pipes preferably extend continuously throughout the length of the heating-chamber, and the same are all supplied from a steam-manifold E, arranged at one end of the heating-chamber. The steam-pipes are connected at one end to the rear side of this manifold, and the latter is supplied by a pipe F, entering its front side and extending through the adjacent head of the heating-chamber. The steam-supply pipe F is provided adjacent to the heating-chamber with a check-valve $f$ for preventing the return of the steam or the entering of water into the same, and the portion of the pipe containing the check-valve is preferably elevated to the level of the top of the heating-chamber, as shown, so that in case of the accidental filling of the chamber with water the steam will, when the water recedes, follow the water down, and by means of the top steam-distributing pipes maintain a steam-pressure on top of the water for the purpose of preventing hammering. For this purpose the upper steam-pipes are arranged in the extreme top of the chamber. In the drawings two upper and four lower steam-delivery pipes are shown, and the two intermediate water-manifolds and the water-manifold at the same end of the heating-chamber as the steam-manifold are provided with conduits $b$ for the passage of those steam-pipes which are inside of the lines of such manifolds, as shown in Fig. 6.

If desired, the end water-manifolds and the steam-manifold, or either of these manifolds, may be cast in one piece with the heads of the heating-chamber, as shown in Fig. 9, instead of being separate therefrom, as shown in the remaining figures.

In addition to the water-delivery orifices in their under sides, the water-distributing pipes are provided in their upper sides with steam-orifices $b'$, through which the steam is permitted to enter the space in the water-pipes above the water therein. By this means free ingress and egress for the steam to and from the space in the pipes above the water-level therein is provided and the steam is always kept above such water-level, thereby preventing the same from commingling with the water or separating the water in the pipes into different bodies or particles and avoiding the pounding resulting therefrom. Each of the water-manifolds is provided in its top with a steam-discharge opening or orifice $b^2$ to prevent the trapping of steam in the top of the manifold upon the sudden rising of the water therein, as in the case of an irregular working of the pump.

The area of the perforated water-distributing branches of the water-manifolds should be greater and the discharge-orifices equal to or greater than the combined area of the water-supply pipes connected with such manifolds, so as to avoid filling the perforated water-pipes and prevent the water from issuing through the upper steam-orifices thereof.

It is obvious that the number of steam-delivery pipes and the number of groups of water-delivery pipes may be increased or reduced in accordance with the desired capacity of the heater and size of the cylinder.

The free open ends of the steam-pipes are preferably bent or curved downwardly, as shown at $d$ in Fig. 1, so as to direct the water downward into the main body of water and prevent its hammering against the adjacent head of the heating-chamber in case the steam pipes and cylinder become filled with water through the careless closing of the outlet-pipe while water is being forced into the heater.

G represents a main blow-off pipe for the various water-distributing pipes, and $h$ $h'$ are branch pipes connecting the end water-manifolds $B'$ $B^4$ with said blow-off pipe. These blow-off branches are connected at their lower ends with the water-supply pipes $C^2$ $C^5$, adjacent to the heating-chamber, and said water-pipes are provided on the outer sides of said blow-off branches with check-valves $h^2$ $h^3$, which prevent the passage of the steam from the water-manifolds into the water-supply pipes, but permit its passage into the main blow-off pipe. Each of the intermediate water-manifolds is connected on one side with the main blow-off pipe by a branch $h^4$, which extends upward from the adjacent water-supply branch of the manifold to the main blow-off pipe, as shown in Figs. 1 and 3. Each intermediate water-manifold is preferably provided with an auxiliary blow-off branch $h^6$, leading from the opposite side thereof to its first-mentioned blow-off branch $h^4$, as shown in Fig. 3. The blow-off preferably extends upward on a level with or above the level of the water-discharge pipes, so as to prevent water from passing through the blow-off pipe to one of the other manifolds when the heater is not on a level, and giving the low manifold more water than there are orifices provided for distribution.

$g$ is the hand-valve arranged in the main blow-off pipe beyond the several branches connected therewith. Upon opening this valve, the steam in the heating-chamber above the body of water enters the water-distributing pipes through their upper and lower orifices and passes through said pipes, the water-manifolds, and the various blow-off branches, escaping finally through the main blow-off pipe, thereby clearing the pipe-orifices, pipes, and water-manifolds of any scale or impurities.

The area of the several blow-off pipes should be equal to the total area of both the water and steam perforations in the water-pipes. The auxiliary pipes $h^4$, connected with the opposite side of the center manifold, provide this additional area. The portions of the water-supply pipes between the check-valves and the end manifolds, as well as the blow-off pipe leading therefrom, are sufficiently large to provide this additional area.

I is a blow-off pipe for the heating-chamber, connected with the bottom of said chamber near its discharge end, and having a hand-valve $i$.

J is a flushing or cleaning pipe which leads from the steam supply-pipe F to the lower front end of the heating-chamber, and whereby steam is delivered along the bottom of the chamber for flushing the same upon opening the blow-off valve $i$. The flushing-pipe has a check-valve $j$ opening toward the heating-chamber. This flushing-pipe forms no part of my present improvement, the same being described and claimed in another application for patent filed by me February 1, 1895, Serial No. 536,937.

K is a settling or purifying chamber which receives the heated feed-water from the heating-chamber through a pipe L, and in which any remaining impurities are separated from the feed-water before its passage into the boiler. This settling-chamber preferably consists of a horizontal tube having its ends closed by heads $k$.

M is the outlet-pipe of the settling-chamber, which is connected with the rear end of the chamber at the top thereof, and N is the usual valved blow-off pipe connected with the rear end of the settling-chamber at the bottom thereof.

$o$ represents a longitudinal series of transverse skimming plates or diaphragms arranged in the upper portion of the settling-chamber and extending from the top of the chamber to about the middle thereof. Any floating substances or impurities in the feed-water are intercepted by the skimming-plates $o$ and prevented from passing with the same into the boiler. These skimming-plates are supported, independently of the shell of the settling-chamber, by one or more longitudinal bars or frames $p$, to which the plates are cast or secured, the lower plates resting against the sides of the chamber and sustaining the bars and plates and the bars being held against longitudinal displacement by one of the heads. By supporting the skimming-plates independently of the shell of the settling-chamber, instead of securing them thereto, the necessity of perforating the shell for the passage of fastening bolts or rivets is obviated and the leakage liable to result therefrom is avoided.

In addition to the skimming-plates $o$ the settling-chamber is preferably provided with a series of lower settling-diaphragms $q$ and a series of intermediate settling-diaphragms $q'$, which are also supported upon the longitudinal bars $p$, as shown in my pending application hereinbefore referred to.

In the normal condition of the apparatus, the valves in the blow-off pipes of the heating-chamber, the water-distributing pipes, and the settling-chamber are closed, and the check-valve of the flushing-pipe is kept in its closed position by the steam-pressure in the heating-chamber and the weight of the column of water in the flushing-pipe. The water sprayed into the heating-chamber through the lower orifices of the water-delivery pipes is met by the steam-jets from the steam-delivery pipe, as hereinbefore described, whereby the water is quickly heated to the necessary degree for liberating the lime and other impurities, which latter settle to the bottom of the heating-chamber. From this chamber the heated feed-water flows through the outlet-pipe L into the settling-chamber, and in passing through the latter the floating and other impurities remaining in the water are skimmed off and intercepted by the skimming and settling diaphragms in said chamber.

The modified construction of the apparatus shown in Figs. 10 to 14 is designed more particularly for use in connection with ordinary boilers. A steam-supply chamber or manifold R is arranged centrally in the heating-chamber, and from each side of this manifold extend four longitudinal steam-distributing pipes $r$, arranged, preferably, in two tiers or rows. On opposite sides of the central steam-manifold are arranged additional steam-manifolds R', and from each side of these side manifolds extends a longitudinal steam-distributing pipe $r'$, the latter pipes being preferably on a level with the lower tier of central steam-pipes $r$, as shown in Fig. 14. The central steam-manifold is supplied from the main steam-pipe by a branch pipe S, extending through the top of the heating-chamber, while the side steam-manifolds are supplied from said main pipe by branch pipes $S'$ $S^2$, extending through the sides of the heating-chamber, as shown in Figs. 10 and 14.

The water-supply manifolds $B^5$ are in this modified construction arranged about midway between the central steam-manifold and the ends of the heating-chamber, and longitudinal water-distributing pipes $B^6$, extend from opposite sides of said manifolds. The row of water-distributing pipes is located between the two rows or tiers of steam-distributing pipes, and the water-pipes are arranged to alternate with the steam-pipes, as shown in Fig. 12 and as described with reference to the first apparatus, so that the descending water does not come in contact with the hot steam-pipes.

The water-manifolds are supplied from the main water-pipe T by ascending branch pipes $t$ and a longitudinal pipe $t'$. These ascending pipes extend through the side walls of the heating-chamber and enter the sides of the water-manifolds.

U is the main blow-off pipe having a valve. $u$ and $u'$ are descending blow-off branches leading from the opposite sides of the water-manifolds, respectively, and connected with the main blow-off pipe by a longitudinal pipe $u^2$ and a transverse pipe $u^3$. In this modification the blow-off pipe is arranged below the level of the water-discharge pipes, and in this case the connecting-pipe $u^3$ for the auxiliary blow-off pipes has a check-valve $u^4$ for preventing the water from passing through the same into the manifolds.

When the heater is used in marine service, the water-discharge pipes are made shorter and with a greater difference in the area of the perforated delivery-pipes over the water-inlet pipes, than in the case of a stationary boiler and the pipes are extended only in one direction from the manifolds, so as to prevent the water from being forced out through the steam-holes at the top of the distributing-pipes when the heater is not level.

I claim as my invention—

1. The combination with a heating-chamber, of a device arranged to distribute the steam throughout the length thereof, a water-supply pipe and horizontal water-delivery pipes of larger area than the supply-pipe arranged in the heating-chamber and provided in their lower portion with discharge-orifices in close proximity to the steam-distributing device and in their upper portion with orifices for the ingress and egress of steam, on top of the water therein, substantially as set forth.

2. The combination with a heating-chamber, of horizontal steam-distributing pipes arranged in the upper portion of the heating-chamber, and water-delivery pipes arranged alternately with said steam-distributing pipes, whereby the water issuing from said water-pipes falls between the steam-pipes without coming in contact therewith, substantially as set forth.

3. The combination with a horizontal heating-chamber, of a row of water-delivery pipes arranged in the upper portion of said chamber, a steam-distributing pipe or pipes arranged above said water-pipes and steam-pipes located below said water-pipes and arranged to alternate with the latter, substantially as set forth.

4. The combination with a heating-chamber, of a water-manifold arranged in the upper portion of said chamber and provided with an inlet, and horizontal distributing-pipes extending from said manifold and having orifices delivering the water downward through the steam-space, substantially as set forth.

5. The combination with a heating-chamber, of a water-manifold arranged in the upper portion of said chamber and provided with an inlet, and horizontal distributing-pipes extending from said manifold and provided in their lower portion with water-delivery orifices and in their upper portion with orifices for the free ingress and egress of steam on top of the water in said pipes, substantially as set forth.

6. The combination with a heating-chamber, of a water-manifold arranged in the upper portion of said chamber and provided with an inlet and horizontal distributing-pipes, and having at its top a steam-discharge opening to prevent the trapping of steam in the top of the manifold, substantially as set forth.

7. The combination with a heating-chamber, of a water-manifold arranged in the upper portion of said chamber and provided with an inlet and horizontal distributing-pipes extending therefrom, and a steam-manifold also arranged in the upper portion of said chamber and provided with an inlet and horizontal steam-distributing pipes extending therefrom and arranged in close proximity to the water-distributing pipes, substantially as set forth.

8. The combination with a heating-chamber of a water-manifold arranged in the chamber adjacent to one end thereof, and having an inlet and horizontal water-distributing pipes extending therefrom, and a steam-manifold arranged adjacent to the opposite end of the chamber and having an inlet and horizontal distributing-pipes extending therefrom, substantially as set forth.

9. The combination with a horizontal heating-chamber and a water-distributing device arranged in the upper portion thereof, of horizontal steam-distributing pipes arranged in the heating-chamber in close proximity to the water-distributing device and having their free open ends bent downward, substantially as set forth.

10. The combination with a heating-chamber, of a water-manifold arranged in the upper portion of said chamber and having an inlet and horizontal distributing-pipes extending therefrom, and a blow-off pipe connected with said manifold, substantially as set forth.

11. The combination with a heating-chamber, of a water-manifold arranged in the upper portion of said chamber and having an inlet and horizontal distributing-pipes extending therefrom and a blow-off pipe connected with said manifold and arranged above the level thereof, substantially as set forth.

12. The combination with the heating-chamber, of a horizontal water-distributing pipe arranged in the upper portion of the chamber and provided in its lower portion with water-discharge orifices, and in its upper portion with orifices for the ingress and egress of steam on top of the water therein, and a blow-off pipe connected with said water-distributing pipe for cleaning both sets of orifices of said distributing-pipe, substantially as set forth.

13. The combination with a settling-chamber having a water-inlet and an outlet, of a separate supporting bar or frame arranged in said chamber, and a series of transverse skimming plates or diaphragms arranged in the upper portion of said chamber and supported on said bar or frame independently of the chamber, substantially as set forth.

14. The combination with a settling-chamber having a water-inlet, an outlet and a blow-off, of a series of transverse skimming-plates arranged in the upper portion of the settling-chamber, a series of transverse diaphragms arranged in the lower portion of the chamber and all separated from the bottom thereof by an intervening water-passage, a series of transverse diaphragms arranged between said skimming-plates and the lower series of diaphragms, and a bar or frame arranged in said chamber and carrying the three series of plates and diaphragms, whereby all of the same are supported independently of the shell of the settling-chamber, substantially as set forth.

Witness my hand this 10th day of September, 1895.

J. TALMAN BUDD.

Witnesses:
CARL F. GEYER,
KATHRYN ELMORE.